United States Patent

Kamins et al.

[11] 3,890,484
[45] June 17, 1975

[54] BEVERAGE-HEATING DEVICE

[76] Inventors: Jerome H. Kamins, 1036 Mayfair Rd., Baldwin, N.Y. 11510; Michael I. Mandell, 15 Westland Dr.; Harry Armen, Jr., 27 Jefferson St., both of Glen Cove, N.Y. 11542; Paul Savet, 505 Alica Dr., Westbury, N.Y.

[22] Filed: June 4, 1973

[21] Appl. No.: 366,483

[52] U.S. Cl. ............... 219/432; 219/433; 219/435; 219/438; 219/442; 219/521
[51] Int. Cl. ........................................... F27d 11/02
[58] Field of Search ........... 219/430, 432, 433, 434, 219/435, 438, 439, 441, 442, 521

[56] References Cited
UNITED STATES PATENTS

| 2,371,975 | 3/1945 | Parsons | 219/433 |
| 2,476,113 | 7/1949 | Ranck | 219/438 |
| 2,603,740 | 7/1952 | Del Buttero | 219/438 X |
| 2,759,091 | 8/1956 | Kolberg | 219/432 |
| 2,863,037 | 12/1958 | Johnstone | 219/432 |
| 3,025,383 | 3/1962 | Forsness, Jr. | 219/432 X |
| 3,038,058 | 6/1962 | Gordon, Jr. | 219/441 |
| 3,130,288 | 4/1964 | Monaco et al. | 219/385 |
| 3,410,989 | 11/1968 | Laws, Jr. | 219/438 |
| 3,432,641 | 3/1969 | Welke | 219/433 |
| 3,573,430 | 4/1971 | Eisler | 219/385 |
| 3,586,824 | 6/1971 | Barney | 219/452 |
| 3,600,554 | 8/1971 | Bange | 219/432 |
| 3,725,645 | 3/1973 | Shevlin | 219/521 |

FOREIGN PATENTS OR APPLICATIONS

| 5,721 | 1905 | United Kingdom | 219/432 |
| 63,313 | 3/1913 | Switzerland | 219/432 |
| 274,445 | 5/1930 | Italy | 219/432 |
| 415,898 | 11/1946 | Italy | 219/432 |
| 563,709 | 11/1932 | Germany | 219/432 |
| 891,230 | 11/1943 | France | 219/432 |

Primary Examiner—Volodymyr Y. Mayewsky
Attorney, Agent, or Firm—Steinberg & Blake

[57] ABSTRACT

A device for heating beverages. A cup, the contents of which is to be heated, is provided with a heating wire embedded in a wall of the cup and having exposed ends which form a pair of contacts. These contacts are adapted to engage, respectively, a pair of electrodes carried by a base and capable of being connected to a source of electricity. A plate is situated over the base, and the cup is located between the base and the plate with the contacts respectively engaging electrodes. Springs are provided for urging the base and plate toward each other to clamp the cup therebetween during heating of a liquid which is in the container.

9 Claims, 10 Drawing Figures

FIG. 2 FIG. 1
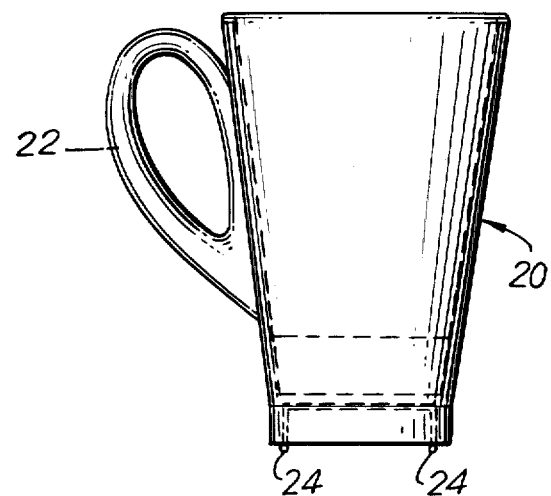
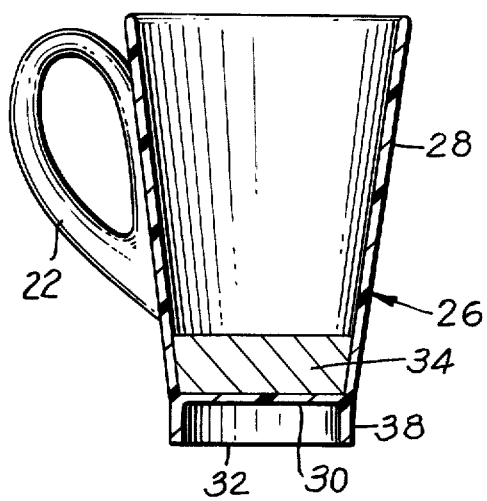
FIG. 3
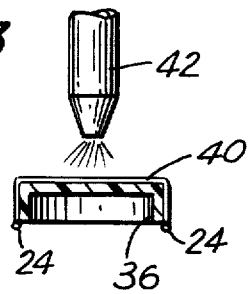
FIG. 5
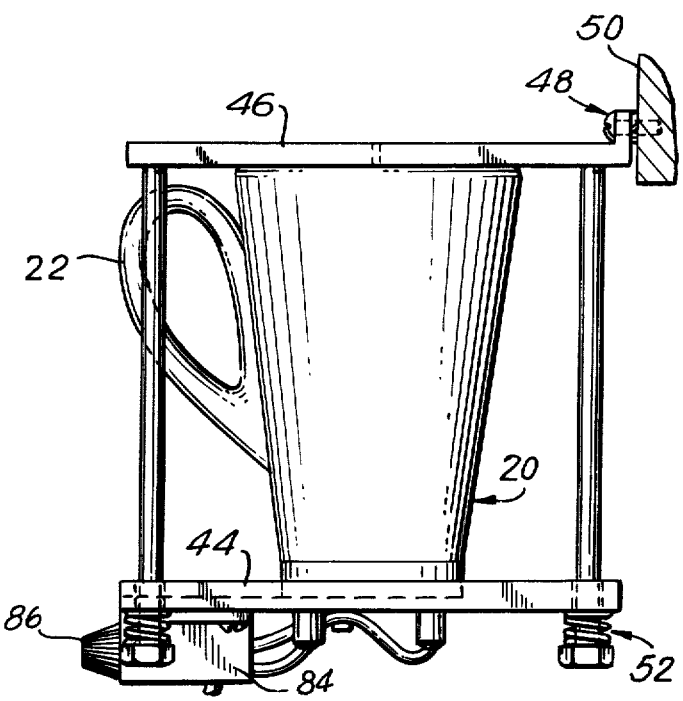
FIG. 4
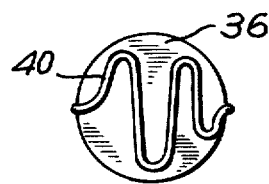

3,890,484

BEVERAGE-HEATING DEVICE

BACKGROUND OF THE INVENTION

The present invention relates to devices to be used for purposes of heating beverages or other contents in a container.

In particular, the present invention relates to devices of this type which are adapted to heat a container in which the contents are located to be heated.

While there are known devices of the above general type, these known devices suffer from several drawbacks. Thus, the known devices are exceedingly complex and expensive. The known devices additionally are large and bulky so that they take up an undesirably large amount of space and are difficult to mount at a desired location.

One of the particular problems encountered with devices of this type lies in the heating of beverages in a vehicle. Of course, relatively large vehicles such as airplanes or ships have sufficient space for accommodating relatively large units, so that the costs and space required for such units can be justified in connection with such large commercial vehicles. However, up to the present time there has been no satisfactory solution to the problem of providing for the average passenger automobile the possibility of heating a beverage conveniently in such a vehicle. It is highly desirable in connection with a passenger automobile, for example, to be able to provide the driver with a heated beverage such as hot coffee, for example, so that if the driver tends to become drowsy such a beverage will serve to combat the drowsiness and thus contribute to safer operation of the vehicle. These considerations apply also to commercial vehicles such as buses and trucks.

SUMMARY OF THE INVENTION

It is accordingly a primary object of the present invention to provide a device of the above general type which will solve the above problems.

In particular, it is an object of the present invention to provide a general heating device which is exceedingly simple and inexpensive while at the same time occupying a relatively small amount of space so that the device of the invention can be used very conveniently in the home or office, or even in such locations as hotels or motel rooms, hospitals, or industrial plants.

A particular object of the present invention, however, resides in providing a liquid heating device which can very conveniently be situated in a passenger automobile as well as in commerical vehicles such as buses or trucks.

A further object of the present invention is to provide a device of this type which can be used in such a way that spilling of a beverage, particularly in a moving vehicle, is reliably avoided.

Yet another object of the invention is to provide a device of the above type which will reliably prevent any damage if it should happen that spilling does occur during mishandling of a cup, for example.

A further object of the present invention is to provide a device of the above type which is safe to operate.

In this latter connection, it it a special object of the present invention to provide a device which will reliably prevent overheating of the contents.

It is furthermore an object of the present invention to provide a device of the above type which can be very conveniently mounted at a desired location.

According to the invention the device includes a container, such as a cup, made of an electrically nonconductive material and having a heating wire embedded in a wall of the cup, this wire having a pair of exposed ends which form a pair of contacts. A base means carries a pair of electrodes for respectively engaging these contacts, and these electrodes are operatively connected with an electrically conductive means adapted to be connected with a source of electricity. Situated over the base means is a plate means for engaging the top of the cup when the contacts of the latter engage the electrodes of the base means, so that the base means and plate means form a pair of means between which the cup is located during heating of the beverage. A spring means is operatively connected with one of the pair of means for urging them toward each other to clamp the cup therebetween during heating of the beverage, or any other liquid selected.

BRIEF DESCRIPTION OF DRAWINGS

The invention is illustrated by way of example in the accompanying drawings which form part of this application and in which:

FIG. 1 is an elevation of a cup which forms part of the device of the invention;

FIG. 2 is a sectional elevation of the cup of FIG. 1 without part of the bottom wall structure;

FIG. 3 is a sectional elevation of the bottom wall structure which is combined with the structure shown in FIG. 2;

FIG. 4 is a top plan view of the structure of FIG. 3;

FIG. 5 is a simplified side elevation of the entire device of the invention during heating of a beverage;

DESCRIPTION OF PREFERRED EMBODIMENTS

Figure 7:
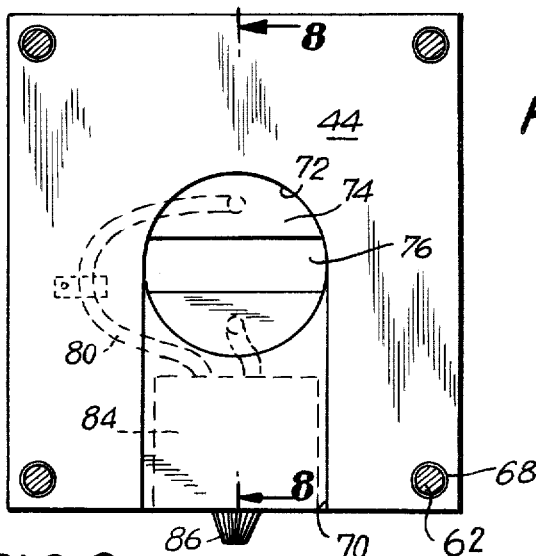
FIG. 7 is a plan view of the base means of FIGS. 5 and 6.
Figure 9:
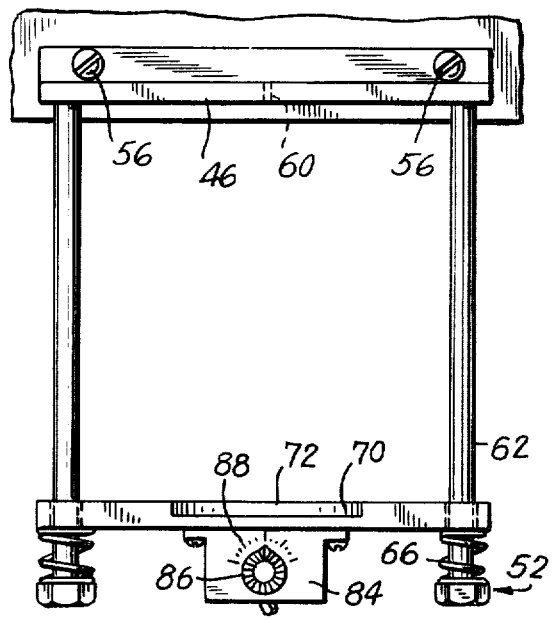
FIG. 9 is a front elevation of the device of FIGS. 5 and 6.
Figure 6:
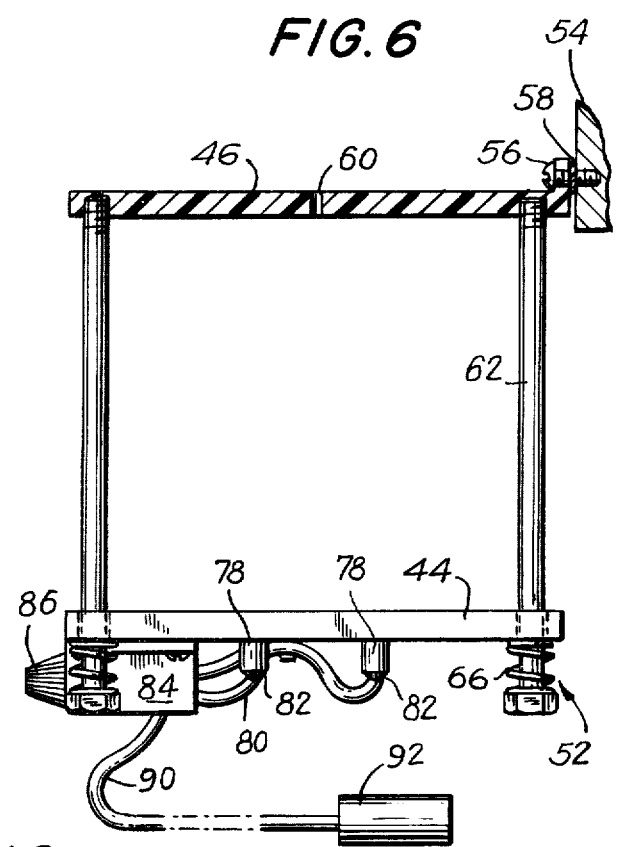
FIG. 6 is a sectional elevation of the device of FIG. 5 showing further details thereof.
Figure 10:
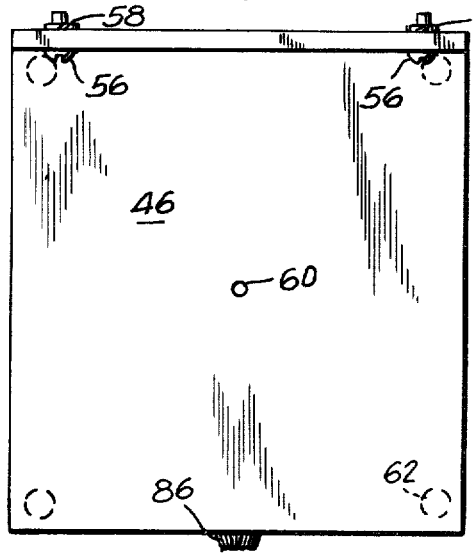
FIG. 10 is plan view of the top plate of the device of FIGS. 5-9.

Referring first to FIG. 1, there is illustrated therein a cup 20, representing a container of the invention. This cup or container 20 is made of an electrically nonconductive material such as any suitable plastic. The cup 20 fixedly carries at its exterior surface a handle 22 and it has at its bottom end a pair of contacts 24 capable of engaging electrodes in a manner described below.

The cup 20 is made up of a pair of components which are illustrated respectively in FIGS. 2 and 3. Thus, in FIG. 2 there is shown the component 26 which includes the outer side wall 28 of the cup and a bottom wall 30 which is spaced from the bottom edge 32 as illustrated. Furthermore, as is shown in FIG. 2, there may be located in the interior of the cup a cake 34 of any dissolvable edible substance such as powdered milk, coffee which may be mixed with sugar and a dry cream product, tea, or the like. Such cakes of edible substance are well known. With such a cake 34 in the interior of the cup it is possible simply to pour a quantity of water into the cup, and when the water is heated the cake 34 will dissolve so that a heated beverage can be prepared in the cup.

Referring to FIG. 3, the component 36 which is illustrated therein has the configuration of an inverted cup-shaped member which is to be inserted into the space directly beneath the bottom wall 30. In this way the component 26 will be directly surrounded by the lower side wall portion 38 of the component 26, and the height of the side wall of component 36 substantially equals the height of the lower side wall portion 38 which extends beneath the bottom wall 30 of FIG. 2, so that in this way the bottom edge of component 36 will be situated at the same elevation as bottom edge 32.

The component 36, which may be made of the same electrically non-conductive plastic material as the component 26 carries at its top surface a heating wire 40 which may be made of a material such as nichrome. This heating wire may have the zig-zag meandering configuration shown in FIG. 4, whose total length and thickness are determined by the energy output required to heat the volume of the contents in the cup at the part of the heating wire 40 which is situated on the top surface of the component 36. The ends of the heating wire 40 extend downwardly along diametrically opposed exterior portions of the component 36, and the heating wire 40 terminates at its ends in the pair of contacts 24 which are situated at the bottom edge of the component 36.

This component 36 with the heating wire 40 thereon can be received with a fairly snug fit in the interior spaced defined by the bottom wall 30 and the lower side wall portion 38 of component 26. The exterior surface of the unit 36 together with the heating wire 40 thereon may first receive a coating of any suitable adhesive, as from a spray unit 42, as illustrated schematically in FIG. 3, so that when the component 36 is received in the space defined by the wall 30 and lower wall portion 38 this component 36 will directly adhere to the component 26, and in the resulting cup structure the contacts 24 will be accessible at the bottom of the cup. In this way it is possible to provide a cup 20 which has a heating wire embedded in its bottom wall with the wire terminating in the contacts 24 which are accessible at the bottom of the cup.

In order to energize the heating wire 40 and heat a liquid which previously has been introduced into the cup, the cup is placed on a beam means 44 between the latter and a plate means 46, as shown schematically in FIG. 5. This plate means 46 carries a mounting means 48 by which the plate means 46 can be mounted on any desired structure 50, such as the dash of a vehicle. In the illustrated example a spring means 52 is operatively associated with the base means 44 to urge the latter upwardly toward the plate means 46, so that the means 44 and 46 form a pair of means between which this cup 20 is clamped during heating of the contents of the cup.

Referring to FIGS. 6–10, it will be seen that the plate means 46 is in the form of a rigid plate which may be made of any desired metal or plastic and which terminates at one end in an upwardly directed flange 54 which forms part of the mounting means 48. This flange 54 is formed with bores through which bolts 56 of the mounting means extend, and these bolts may be provided with washers 58, for example. Thus, these bolts 56 may be passed through openings formed in the structure 50 to receive nuts which thus serve to fixedly mount the plate means 46 on the structure 50. Of course, this type of fastening is only by way of example. If desired certain wood screws may be used. For example in the event that the structure of the invention is to be used in the home rather than in a vehicle, it is possible to provide wood screws which can be driven into any cabinet structure or other wood structure, for example, in order to mount the plate means 46 on a supporting structure 50. The plate means 46 includes a central vent opening 60 through which vapors generated during heating of a liquid in the cup may escape, this opening 60 being aligned with the central axis of the cup when the latter is properly situated on the base means 44. In addition the vent 60 will serve to create a whistling sound when the liquid in the cup has been heated to a given extent, so that in this way a warning will be given that the heating of the contents of the cup has been completed.

The plate 46 is formed at its underside with four bores which pass only partly through the plate and which are internally threaded for respectively receiving the threaded ends of four vertically extending rods 62 which thus are fixed to and extend downwardly from the plate means 46. These rods 62 extend through openings which are formed in the base means 44. Thus, the base means 44 may take the form of any non-conductive substantially rigid material such as any suitable plastic, for example, and this base means 44 is formed with four openings aligned with the rods 62 and having a diameter slightly greater than the rods 62 so that the latter can initially be passed freely through the openings of the base 44 before being threaded into the bores of the plate means 46.

The rods 62 terminate at their lower ends in enlarged heads 64. Before the rods 62 are passed through the openings of the base 44, a plurality of coil springs 66, which constitute the spring means 52, are placed respectively around the rods 62. Thus, the rods 62 with the coil springs 66 thereon are passed respectively through the openings of the base 44 and then threaded into the internally threaded bores of the plate 46, in order to assemble the components shown in FIG. 6.

Figure 8:
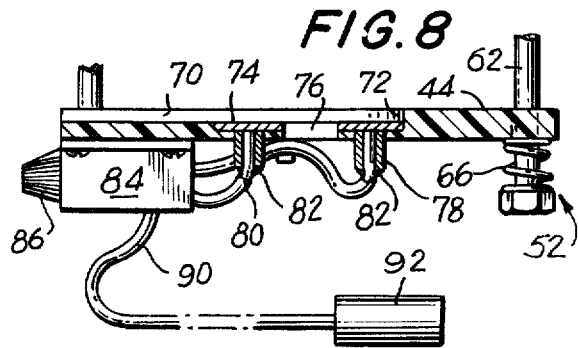
FIG. 8 is a sectional elevation taken along line 8—8 of FIG. 7 in the direction of the arrows.

As may be seen particularly from FIGs. 7 and 8, the base means 44 which is formed with the openings 68 through which the rods 62 respectively pass is also formed at its upper surface with an elongated guide groove or recess 70 having a width only slightly greater than the bottom end of the cup 20 so that the bottom end of the cup can readily be guided along the elongated recess 70 up to the inner semicircular end 72 thereof. At the region of the inner end 72 of the guide recess 70 of the base means 44 is formed with a pair of further recesses for respectively receiving the semicircular electrodes 74. These electrodes are spaced from each other and are respectively situated at opposite sides of an opening 76 which is formed in the base means 44 passing completely therethrough and situated between and separating the pair of electrodes 74. The depth of the recesses which respectively receive the electrodes 74 is equal to the thickness of these electrodes so that the pair of electrodes 74 will have top surfaces which are flush with the bottom surface of the elongated guide recess 70, as shown particularly in FIG. 8. The metal electrodes 74 are rigidly fixed with metal tubes 78 which respectively extend down through circular openings formed in the base means 44, these metal tubes 78 being fixed to the electrodes 74 as by being welded or soldered thereto. A pair of elongated conductors 80, in the form of insulation-covered wires, for example, have the insulation removed at free ends which are introduced into the sleeves 78. The conductors 80 at their exposed free ends have a snug fit in the sleeves 78, and in addition soldering or welding material 82 may be situated at the bottom ends of the sleeves 78 around the conductors 80 for fixing the latter reliably to the sleeves 78 in good electrical contact therewith. These conductors 80 are respectively connected with a pair of terminals of a conventional thermostat 84 which is bolted to the underside of the electrically non-conductive base means 44 at the region of its front end. The conventional thermostat 84 carries at its front surface a rotary adjusting knob 86 which carries an index to cooperate with a scale 88, so that the operator can adjust the thermostat 84. The thermostat 84 has a connection to an additional conductor 90 terminating in the illustrated example in a plug 92 of the type which can be received in a cigarette lighter receptacle. Thus, with the particular example illustrated the plug 92 will be introduced into the cigarette lighter receptacle of a vehicle such as an automobile. When the device is to be used in the home, the conductor 86 will terminate in a conventional pronged plug to be received in a wall outlet. Thus, the conductors 80 together with the thermostat 84 and components 90 and 92 form an electrically conductive means for connecting the electrodes 74 to a source of electricity. Of course the thermostate 84 forms a control means for controlling the extent of heating, and the vent 60 forms an additional safety measure for giving an audible warning when the contents of the cup have been sufficiently heated.

It is to be noted from FIG. 1 that the pair of contacts 24 and the handle 22 are all located in a common plane. In other words a vertical plane which contains the handle 22 and the central axis of the cup 20 will also contain the pair of contacts 24. As a result the operator will normally hold the cup by the handle 22 and introduce the cup inwardly along the guide recess 70 in such a way that the left contact 24 of FIG. 1 will move into engagement with the electrode 74 at the end 72 of the guide recess 70, while the right contact 24 of FIG. 1 will engage the front electrode 74. Then when the plug 80 is introduced in to the cigarette lighter, the circuit will be completed and the heating wire 40 will be energized.

Of course, before the cup 20 is placed in the condition shown in FIG. 5 where it is clamped between the plate means 46 and the base means 44, a suitable liquid is introduced into the cup. In the case of an automobile, the driver can have on hand a suitable container of water, for example, from which the water is poured into the cup to a desired elevation therein, and it may be assumed that an edible cake 34 is initially located in the cup. Of course if preferred it is possible to first heat simply water until it boils and then the cup can be removed so that powdered coffee or a tea bag or the like can be placed into the heated water.

In any event, before introducing the cup 20 into the guide recess 70, the cup 20 is provided with the contents which are to be heated, and the operator will then manually depress the base means 44 in opposition to the force of the spring means 52 so that the cup 20 can readily be received in the space between the components 44 and 46. Once the cup is situated between this space the plate 44 can be released and the operator can simply slide the cup into the position shown in FIG. 5 where the cup engages the inner end 72 of the guide recess 70. Because the handle 22 will be oriented forwardly as shown in FIG. 5, the contacts 24 will reliably engage the electrodes 74. Once the contents of the cup 20 are heated the operator can simply pull on the handle 22 in order to remove the cup. If through any accident the cup is inadvertently tilted so that the contents thereof spill to some extent, the spilling will take place directly through the opening 76 without any damage.

As may be seen from FIG. 7, one of the conductors 80 extend on one side of the guide recess 70, being retained in the position indicated in FIG. 7 by any suitable clip or the like which is fastened to the lower surface of the base means 44, so that in this way any liquid which may accidently fall through the opening 76 will not fall on either one of the conductors 80.

What is claimed is:

1. For use in the preparation of a heated liquid, a container made of an electrically non-conductive material, an electrically conductive heating wire embedded in a wall portion of the container between inner and outer surfaces of said wall portion, said heating wire having a pair of opposed ends exposed at the exterior of the container to form a pair of contacts to be connected to a source of current for energizing the heating wire to heat a liquid situated in the container, said contacts being situated at the bottom of the container, an electrically non-conductive base means supporting said container during the heating thereof, said base means carrying a pair of electrodes which engage said contacts, electrically conductive means connected to said electrodes for connecting the latter to a source of electricity, plate means situated over said base means and engaging the top of the container so that said base means and plate means form a pair of means between which said container is located during heating of the container, and spring means operatively connected with one of said pair of means for urging the latter toward each other when said container is situated between said pair of means, so that the container is clamped between said pair of means during heating of the container.

2. The combination of claim 1 and wherein a control means is electrically connected with said electrically conductive means for controlling the temperature to which the container is heated.

3. The combination of claim 1 and wherein said base means is formed between said electrodes with an opening passing through said base means.

4. The combination of claim 1 and wherein said plate means carries a mounting means for mounting said plate means on a supporting structure, said plate means carrying a plurality of rods which extend downwardly from said plate means and said base means being formed with openings through which said rods respectively extend, said spring means including a plurality of coil springs surrounding at least some of said rods beneath said base means for urging the latter upwardly toward said plate means when a container is situated between said pair of means, said spring means normally locating said base means at a distance from said plate means which is less than the height of said container so that said base means must first be depressed in opposition to said spring means before a container is accommodated between said pair of means.

5. The combination of claim 4 and wherein said base means is formed at its upper surface with an elongated recess in which said container is guided at its bottom end to be moved into a position where said contacts respectively engage said electrodes.

6. The combination of claim 5 and wherein said mounting means is adapted to mount said plate means on the dash of a vehicle, said electrically conductive means terminating in a plug which is adapted to be received in a receptacle for a cigarette lighter for supplying electricity to said electrodes from a battery of a vehicle.

7. For use in the preparation of a heated liquid, a container made of an electrically nonconductive material, said container having an endless side wall formed with an open top and terminating in a bottom edge on which the container is adapted to rest, and said container having a bottom wall situated above said bottom edge and extending across the interior of said container, an electrically conductive heating wire engaging a lower surface of said bottom wall which is directed downwardly away from the interior of said container, said heating wire having a pair of opposed ends extending downwardly along an inner surface of said endless side wall from said lower surface of said bottom wall and exposed at the exterior of the container at said bottom edge thereof to form a pair of contacts to be connected to a source of current for energizing the heating wire to heat a liquid situated in the container above the bottom wall thereof, and electrically non-conductive means situated in a space defined between said bottom wall and said bottom edge of said container for retaining said heating wire in engagement with said bottom wall at said lower surface thereof with said opposed ends of said heating wire exposed at said bottom edge, said means for retaining the heating wire against said bottom wall being in the form of an inverted dished member pressed into said space and having a top wall carrying said heating element and maintaining the latter against the lower surface of said bottom wall with said dished member adhering to said bottom wall and having its own opposed side wall portions situated within the part of said endless side wall of said container which extends downwardly from said bottom wall thereof with said opposed ends of said heating wire being situated between said opposed side wall portions of said dished member and the part of said endless side wall of said container which extends downwardly from said bottom wall thereof.

8. For use in the preparation of a heated liquid, a container made of an electrically non-conductive material, an electrically conductive heating wire embedded in a wall portion of the container between inner and outer surfaces of said wall portion, said heating wire having a pair of opposed ends exposed at the exterior of the container to form a pair of contacts to be connected to a source of current for energizing the heating wire to heat a liquid situated in the container, an electrically non-conductive base means supporting said container during the heating thereof, said base means carrying a pair of electrodes which engage said contacts, electrically conductive means connected to said electrodes for connecting the latter to a source of electricity, plate means situated over said base means and engaging the top of the container so that said base means and plate means form a pair of means between which said container is located during heating of the container, and urging means operatively connected with one of said pair of means for urging the latter toward each other when said container is situated between said pair of means, so that the container is clamped between said pair of means during heating of the container.

9. The combination of claim 8 and wherein said plate means is formed over the interior of said container with an opening for providing an audible signal when a liquid in the container has been heated to a given degree.

* * * * *